US009343112B2

(12) United States Patent
Amidei et al.

(10) Patent No.: US 9,343,112 B2
(45) Date of Patent: May 17, 2016

(54) SYSTEMS AND METHODS FOR SUPPLEMENTING CONTENT FROM A SERVER

(71) Applicant: Sonic IP, Inc., San Diego, CA (US)

(72) Inventors: William Amidei, La Jolla, CA (US); Francis Chan, San Diego, CA (US); Eric Grab, San Diego, CA (US); Michael Kiefer, Lake Havasu City, AZ (US); Aaron McDaniel, La Mesa, CA (US); John Mickus, San Marcos, CA (US); Ronald Mombourquette, San Diego, CA (US); Nikolai Popov, Tierrasanta, CA (US); Fred Zuill, Poway, CA (US)

(73) Assignee: Sonic IP, Inc., San Diego, CA (US)

( * ) Notice: Subject to any disclaimer, the term of this patent is extended or adjusted under 35 U.S.C. 154(b) by 0 days.

(21) Appl. No.: 14/068,881

(22) Filed: Oct. 31, 2013

(65) Prior Publication Data

US 2015/0117836 A1      Apr. 30, 2015

(51) Int. Cl.
*G11B 27/11* (2006.01)
*G11B 27/28* (2006.01)
*H04N 5/445* (2011.01)
*H04N 21/43* (2011.01)
(Continued)

(52) U.S. Cl.
CPC ............... *G11B 27/11* (2013.01); *G11B 27/28* (2013.01); *H04N 5/44591* (2013.01); *H04N 21/4307* (2013.01); *H04N 21/4725* (2013.01); *H04N 21/6581* (2013.01); *H04N 2005/44595* (2013.01)

(58) Field of Classification Search
USPC ....................... 725/40, 60, 61, 112
See application file for complete search history.

(56) References Cited

U.S. PATENT DOCUMENTS

| 5,361,332 A | 11/1994 | Yoshida et al. |
| 5,404,436 A | 4/1995 | Hamilton |

(Continued)

FOREIGN PATENT DOCUMENTS

| EP | 813167 A2 | 12/1997 |
| JP | 2004013823 A | 1/2004 |

(Continued)

OTHER PUBLICATIONS

"Supported Media Formats", Supported Media Formats, Android Developers, Nov. 27, 2013, 3 pgs.

(Continued)

*Primary Examiner* — Mulugeta Mengesha
(74) *Attorney, Agent, or Firm* — KPPB LLP (57) ABSTRACT

Methods and systems to provide supplemental content to a user who is viewing video or other content. The user's device (through which he will access the video) then provides an identifier of that video to a server or other computing facility. Here, the video identifier is used to identify supplemental content that corresponds to the user's video. The supplemental content is then provided to the user device for the user's consumption. The supplemental content may be structured in such a way that pieces of the supplemental content are accessible at particular points in the video. The piece(s) of the supplemental content available at a particular point in the video will be related to one or more objects that are present at this point. This allows a user to access one or more pieces of supplemental content in a context-specific manner, at a point in the video where the piece(s) of supplemental content are relevant.

36 Claims, 10 Drawing Sheets (51) Int. Cl.
*H04N 21/4725* (2011.01)
*H04N 21/658* (2011.01)

(56) References Cited

U.S. PATENT DOCUMENTS

| | | | |
|---|---|---|---|
| 6,031,622 A | 2/2000 | Ristow et al. | |
| 6,195,388 B1 | 2/2001 | Choi et al. | |
| 6,658,056 B1 | 12/2003 | Duruöz et al. | |
| 6,807,306 B1 | 10/2004 | Girgensohn et al. | |
| 6,859,496 B1 | 2/2005 | Boroczky et al. | |
| 6,956,901 B2 | 10/2005 | Boroczky et al. | |
| 7,242,772 B1 | 7/2007 | Tehranchi | |
| 7,478,325 B2 | 1/2009 | Foehr | |
| 8,023,562 B2 | 9/2011 | Zheludkov et al. | |
| 8,046,453 B2 | 10/2011 | Olaiya | |
| 8,054,880 B2 | 11/2011 | Yu et al. | |
| 8,225,061 B2 | 7/2012 | Greenebaum | |
| 8,233,768 B2 | 7/2012 | Soroushian et al. | |
| 8,249,168 B2 | 8/2012 | Graves | |
| 8,270,473 B2 | 9/2012 | Chen et al. | |
| 8,270,819 B2 | 9/2012 | Vannier | |
| 8,289,338 B2 | 10/2012 | Priyadarshi et al. | |
| 8,311,115 B2 | 11/2012 | Gu et al. | |
| 8,321,556 B1 | 11/2012 | Chatterjee et al. | |
| 8,386,621 B2 | 2/2013 | Park | |
| 8,412,841 B1 | 4/2013 | Swaminathan et al. | |
| 8,456,380 B2 | 6/2013 | Pagan | |
| 8,472,792 B2 | 6/2013 | Butt | |
| 8,914,534 B2 | 12/2014 | Braness et al. | |
| 2002/0120934 A1* | 8/2002 | Abrahams | 725/60 |
| 2003/0002578 A1 | 1/2003 | Tsukagoshi et al. | |
| 2003/0061369 A1 | 3/2003 | Aksu et al. | |
| 2003/0152370 A1 | 8/2003 | Otomo et al. | |
| 2003/0231863 A1 | 12/2003 | Eerenberg et al. | |
| 2003/0231867 A1 | 12/2003 | Gates et al. | |
| 2003/0236836 A1 | 12/2003 | Borthwick | |
| 2003/0236907 A1 | 12/2003 | Stewart et al. | |
| 2004/0136698 A1 | 7/2004 | Mock | |
| 2005/0038826 A1 | 2/2005 | Bae et al. | |
| 2005/0193070 A1 | 9/2005 | Brown et al. | |
| 2005/0193322 A1 | 9/2005 | Lamkin et al. | |
| 2005/0204289 A1 | 9/2005 | Mohammed et al. | |
| 2005/0207442 A1 | 9/2005 | Zoest et al. | |
| 2005/0207578 A1 | 9/2005 | Matsuyama et al. | |
| 2005/0273695 A1 | 12/2005 | Schnurr | |
| 2005/0275656 A1 | 12/2005 | Corbin et al. | |
| 2006/0026294 A1 | 2/2006 | Virdi et al. | |
| 2006/0078301 A1 | 4/2006 | Ikeda et al. | |
| 2006/0129909 A1 | 6/2006 | Butt et al. | |
| 2006/0173887 A1 | 8/2006 | Breitfeld et al. | |
| 2006/0245727 A1 | 11/2006 | Nakano et al. | |
| 2006/0259588 A1 | 11/2006 | Lerman et al. | |
| 2006/0263056 A1 | 11/2006 | Lin et al. | |
| 2007/0031110 A1 | 2/2007 | Rijckaert | |
| 2007/0047901 A1 | 3/2007 | Ando et al. | |
| 2007/0083617 A1 | 4/2007 | Chakrabarti et al. | |
| 2007/0086528 A1 | 4/2007 | Mauchly et al. | |
| 2007/0140647 A1 | 6/2007 | Kusunoki et al. | |
| 2007/0154165 A1 | 7/2007 | Hemmeryckx-Deleersnijder et al. | |
| 2007/0168541 A1 | 7/2007 | Gupta et al. | |
| 2007/0180125 A1 | 8/2007 | Knowles et al. | |
| 2007/0239839 A1 | 10/2007 | Buday et al. | |
| 2007/0292107 A1 | 12/2007 | Yahata et al. | |
| 2008/0101466 A1 | 5/2008 | Swenson et al. | |
| 2008/0126248 A1 | 5/2008 | Lee et al. | |
| 2008/0137736 A1 | 6/2008 | Richardson et al. | |
| 2008/0192818 A1 | 8/2008 | DiPietro et al. | |
| 2008/0256105 A1 | 10/2008 | Nogawa et al. | |
| 2008/0263354 A1 | 10/2008 | Beuque | |
| 2008/0279535 A1 | 11/2008 | Haque et al. | |
| 2008/0310496 A1 | 12/2008 | Fang | |
| 2009/0031220 A1 | 1/2009 | Tranchant et al. | |
| 2009/0037959 A1 | 2/2009 | Suh et al. | |
| 2009/0060452 A1 | 3/2009 | Chaudhri | |
| 2009/0066839 A1 | 3/2009 | Jung et al. | |
| 2009/0132599 A1 | 5/2009 | Soroushian et al. | |
| 2009/0132721 A1 | 5/2009 | Soroushian et al. | |
| 2009/0150557 A1 | 6/2009 | Wormley et al. | |
| 2009/0169181 A1 | 7/2009 | Priyadarshi et al. | |
| 2009/0201988 A1 | 8/2009 | Gazier et al. | |
| 2009/0217317 A1* | 8/2009 | White | 725/32 |
| 2009/0226148 A1 | 9/2009 | Nesvadba et al. | |
| 2009/0293116 A1 | 11/2009 | DeMello et al. | |
| 2009/0303241 A1 | 12/2009 | Priyadarshi et al. | |
| 2009/0307258 A1 | 12/2009 | Priyadarshi et al. | |
| 2009/0307267 A1 | 12/2009 | Chen et al. | |
| 2009/0313544 A1 | 12/2009 | Wood et al. | |
| 2009/0313564 A1 | 12/2009 | Rottler et al. | |
| 2009/0328124 A1 | 12/2009 | Khouzam et al. | |
| 2010/0040351 A1 | 2/2010 | Toma et al. | |
| 2010/0094969 A1 | 4/2010 | Zuckerman et al. | |
| 2010/0095121 A1 | 4/2010 | Shetty et al. | |
| 2010/0111192 A1 | 5/2010 | Graves | |
| 2010/0158109 A1 | 6/2010 | Dahlby et al. | |
| 2010/0189183 A1 | 7/2010 | Gu et al. | |
| 2010/0228795 A1 | 9/2010 | Hahn | |
| 2010/0235472 A1 | 9/2010 | Sood et al. | |
| 2011/0067057 A1* | 3/2011 | Karaoguz et al. | 725/38 |
| 2011/0080940 A1 | 4/2011 | Bocharov | |
| 2011/0126191 A1 | 5/2011 | Hughes et al. | |
| 2011/0129011 A1 | 6/2011 | Cilli et al. | |
| 2011/0142415 A1 | 6/2011 | Rhyu | |
| 2011/0150100 A1 | 6/2011 | Abadir | |
| 2011/0153785 A1 | 6/2011 | Minborg et al. | |
| 2011/0239078 A1 | 9/2011 | Luby et al. | |
| 2011/0246659 A1 | 10/2011 | Bouazizi | |
| 2011/0268178 A1 | 11/2011 | Park | |
| 2011/0302319 A1 | 12/2011 | Ha et al. | |
| 2011/0305273 A1 | 12/2011 | He et al. | |
| 2011/0314176 A1 | 12/2011 | Frojdh et al. | |
| 2011/0314500 A1 | 12/2011 | Gordon et al. | |
| 2012/0023251 A1 | 1/2012 | Pyle et al. | |
| 2012/0093214 A1 | 4/2012 | Urbach | |
| 2012/0170642 A1 | 7/2012 | Braness et al. | |
| 2012/0170643 A1 | 7/2012 | Soroushian et al. | |
| 2012/0170906 A1 | 7/2012 | Soroushian et al. | |
| 2012/0170915 A1 | 7/2012 | Braness et al. | |
| 2012/0173751 A1 | 7/2012 | Braness et al. | |
| 2012/0278496 A1 | 11/2012 | Hsu | |
| 2012/0307883 A1 | 12/2012 | Graves | |
| 2013/0044821 A1 | 2/2013 | Braness et al. | |
| 2013/0046902 A1 | 2/2013 | Villegas Nuñez et al. | |
| 2013/0061045 A1 | 3/2013 | Kiefer et al. | |
| 2015/0117837 A1 | 4/2015 | Amidei et al. | |

FOREIGN PATENT DOCUMENTS

| | | | |
|---|---|---|---|
| JP | 2004172830 A | 6/2004 | |
| JP | 2007036666 A | 2/2007 | |
| JP | 2007535881 A | 12/2007 | |
| JP | 2014506430 A | 3/2014 | |
| WO | 2004102571 A1 | 11/2004 | |
| WO | 2009065137 A1 | 5/2009 | |
| WO | 2010060106 A1 | 5/2010 | |
| WO | 2010122447 A1 | 10/2010 | |
| WO | 2010147878 A1 | 12/2010 | |
| WO | 2012094171 A1 | 7/2012 | |
| WO | 2012094181 A2 | 7/2012 | |
| WO | 2012094189 A1 | 7/2012 | |

OTHER PUBLICATIONS

European Search Report for Application 11855237.1, search completed Jun. 12, 2014, 9 pgs.
Federal Computer Week, "Tool Speeds Info to Vehicles", Jul. 25, 1999, 5 pgs.
HTTP Live Streaming Overview, Networking & Internet, Apple, Inc., Apr. 1, 2011, 38 pgs.
Informationweek: Front End: Daily Dose, "Internet on Wheels", Jul. 20, 1999, 3 pgs.
International Search Report and Written Opinion for International Application PCT/US2011/066927, International Filing Date Dec. 22, 2011, Report Completed Apr. 3, 2012, Mailed Apr. 20, 2012, 14 pgs.

(56) References Cited

OTHER PUBLICATIONS

International Search Report and Written Opinion for International Application PCT/US2011/067167, International Filing Date Dec. 23, 2011, Report Completed Jun. 19, 2012, Mailed Jul. 2, 2012, 11 pgs.
ITS International, "Fleet System Opts for Mobile Server", Aug. 26, 1999, 1 page.
Microsoft, Microsoft Media Platform: Player Framework, "Silverlight Media Framework v1.1", 2 pgs.
Microsoft, Microsoft Media Platform:Player Framework, "Microsoft Media Platform: Player Framework v2.5 (formerly Silverlight Media Framework)", 2 pgs.
The Official Microsoft IIS Site, Smooth Streaming Client, 4 pgs.
"Adaptive Streaming Comparison", Jan. 28, 2010, 5 pgs.
"Best Practices for Multi-Device Transcoding", Kaltura Open Source Video, 13 pgs.
"Netflix turns on subtitles for PC, Mac streaming", 3 pgs.
"Thread: SSME (Smooth Streaming Medial Element) config.xml review (Smooth Streaming Client configuration file)", 3 pgs.
"Transcoding Best Practices", From movideo, Nov. 27, 2013, 5 pgs.
"Using HTTP Live Streaming", iOS Developer Library, Retrieved from: http://developer.apple.com/library/ios/#documentation/networkinginternet/conceptual/streamingmediaguide/UsingHT-TPLiveStreaming/UsingHTTPLiveStreaming.html#//apple_ref/doc/uid/TP40008332-CH102-SW1, 10 pgs.
U.S. Appl. No. 13/224,298, "Final Office Action Received", May 19, 2014, 27 pgs.
Akhshabi et al., "An Experimental Evaluation of Rate-Adaptation Algorithms in Adaptive Streaming over HTTP", MMSys'11, Feb. 24-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, pp. 1-9.
Author Unknown, "Tunneling QuickTime RTSP and RTP over HTTP", Published by Apple Computer, Inc.: 1999 (month unknown), 6 pgs.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 15 pgs.
Inlet Technologies, "Adaptive Delivery to iDevices", 2 pgs.
Inlet Technologies, "Adaptive delivery to iPhone 3.0", 2 pgs.
Inlet Technologies, "HTTP versus RTMP", 3 pgs.
Inlet Technologies, "The World's First Live Smooth Streaming Event: The French Open", 2 pgs.
Kim, Kyuheon, "MPEG-2 ES/PES/TS/PSI", Kyung-Hee University, Oct. 4, 2010, 66 pgs.
Kurzke et al., "Get Your Content Onto Google TV", Google, Retrieved from: http://commondatastorage.googleapis.com/io2012/presentations/live%20to%20website/1300.pdf, 58 pgs.
Lang, "Expression Encoder, Best Practices for live smooth streaming broadcasting", Microsoft Corporation, 20 pgs.
Levkov, "Mobile Encoding Guidelines for Android Powered Devices", Adobe Systems Inc., Addendum B, source and date unknown, 42 pgs.
MSDN, "Adaptive streaming, Expression Studio 2.0", 2 pgs.
Nelson, "Smooth Streaming Deployment Guide", Microsoft Expression Encoder, Aug. 2010, 66 pgs.
Noe, A., "Matroska File Format (under construction!)", Retrieved from the Internet: URL:http://web.archive.org web/20070821155146/www.matroska.org/technical/specs/matroska.pdf, retrieved on Jan. 19, 2011, Jun. 24, 2007, pp. 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R., "HTTP Live Streaming: draft-pantos-http-live-streaming-06", Published by the Internet Engineering Task Force (IETF), Mar. 31, 2011, 24 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne, H. et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pgs.
Siglin, "HTTP Streaming: What You Need to Know", streamingmedia.com, 2010, 15 pgs.
Siglin, "Unifying Global Video Strategies, MP4 File Fragmentation for Broadcast, Mobile and Web Delivery", Nov. 16, 2011, 16 pgs.
Wu, Feng et al., "Next Generation Mobile Multimedia Communications: Media Codec and Media Transport Perspectives", In China Communications, Oct. 2006, pp. 30-44.
Zambelli, Alex, "IIS Smooth Streaming Technical Overview", Microsoft Corporation, Mar. 2009.

* cited by examiner

SYSTEMS AND METHODS FOR SUPPLEMENTING CONTENT FROM A SERVER

BACKGROUND

While consuming content, a user may wish to access additional related content. This may be motivated by a desire to learn more about the subject of the content or about something mentioned therein, for example.

In the context of written articles, this can be addressed using hypertext. When reading an article on the internet, the article may contain hyperlinks that represent avenues for the access of additional content. Clicking on a word or phrase may lead to a definition of the word, or to another article about the subject for example. Another web page may be used to present this additional information.

When viewing a video, however, the mechanisms available to the user for the access of related content are generally more limited. In the context of a web page containing a video, hyperlinks may be present elsewhere on the page, such that the user may click on these to access related content. But in other cases, such as when a user is viewing video that has been streamed or downloaded, the user currently has no convenient way to get supplemental content, such as text commentary, or related video or audio.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems to provide supplemental content to a user who is viewing video or other content. In an embodiment, a user may wish to watch a video. The user's device (through which he will access the video) then provides an identifier of that video to a server or other computing facility. At this facility, the video identifier is used to identify supplemental content that corresponds to the user's video. The supplemental content is then provided to the user device for the user's consumption. In an alternative embodiment, the supplemental content may be multiplexed with the video at the computing facility, such that the video and the supplemental content are provided together to the user device. The supplemental content may be structured in such a way that pieces of the supplemental content are accessible at particular points in the video. The piece(s) of the supplemental content available at a particular point in the video will be related to one or more objects that are present at this point. This allows a user to access one or more pieces of supplemental content in a context-specific manner, at a point in the video where the piece(s) of supplemental content are relevant.

Figure 1:
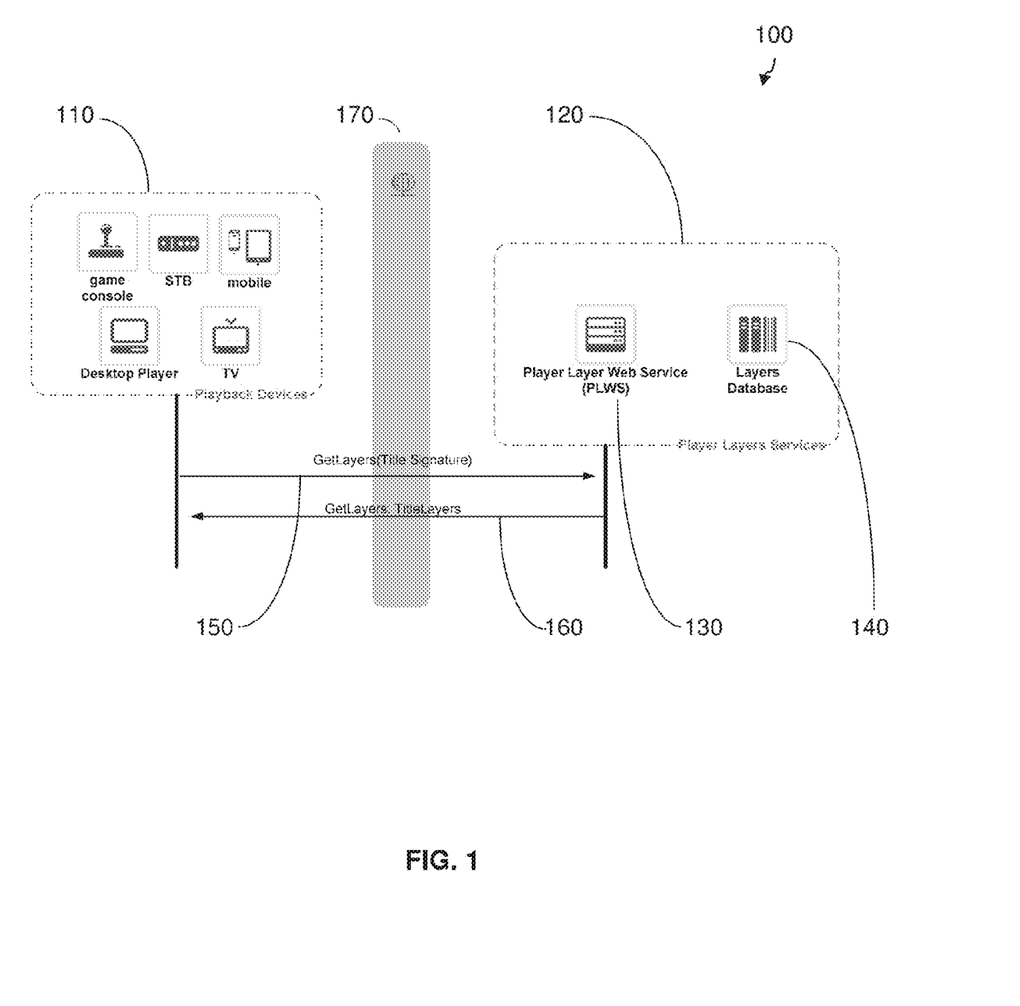
FIG. 1 is a block diagram of an exemplary system that implements the methods described herein, according to an embodiment.

An embodiment of the system described herein is illustrated in FIG. 1. Here, a playback device 110 of a user may receive data representing a video and allow the user to view the video. Such user devices may include, without limitation, a television, a set-top box (STB), a mobile computing device such as a smart phone, tablet, or wearable computer, a desktop or laptop computer, or a game console. The user device 110 is in communication with one or more services that provide supplemental content related to the video. The supplemental content may be modeled as one or more layers on top of the video, and is referred to herein as layer information. These services are shown collectively as player layer services 120. In the illustrated embodiment, the player layer services 120 include a player layer web service 130, denoted herein as a layer service for the sake of brevity. Player layer services may also include a layers database 140 for the storage of the supplemental content (i.e., layer information). Player layer services 120 may be embodied in a programmable computing device, such as a server (referred to herein as a layer server). Moreover, in an embodiment the player layer services may be located at a location remote from the user device, and may remotely service a number of users and their devices through a network 170. In an embodiment, network 170 may represent the Internet or any portion thereof.

The user device sends an identifier of the video to the player layer services 120. The video identifier may take the form of a signature unique to the video (as shown here), but more generally may be any unambiguous identifier of the video. Another example of such an identifier would be a title identification (ID). In the illustrated embodiment, the video identifier may take the form of an argument in a request 150 (GetLayers) seeking layer information. In response, the layer information specific to the video is provided to the user device 110 in message 160.

The processing described above is shown in FIG. 2, according to an embodiment. In the illustrated process, the user device receives the video at 210. At 220, the user device determines the identifier of the video. As noted above, the identifier may be a signature or other data that unambiguously denotes the video. At 230, the user device sends the video identifier to the layer service. At 240, the layer service receives the video identifier.

Figure 2:
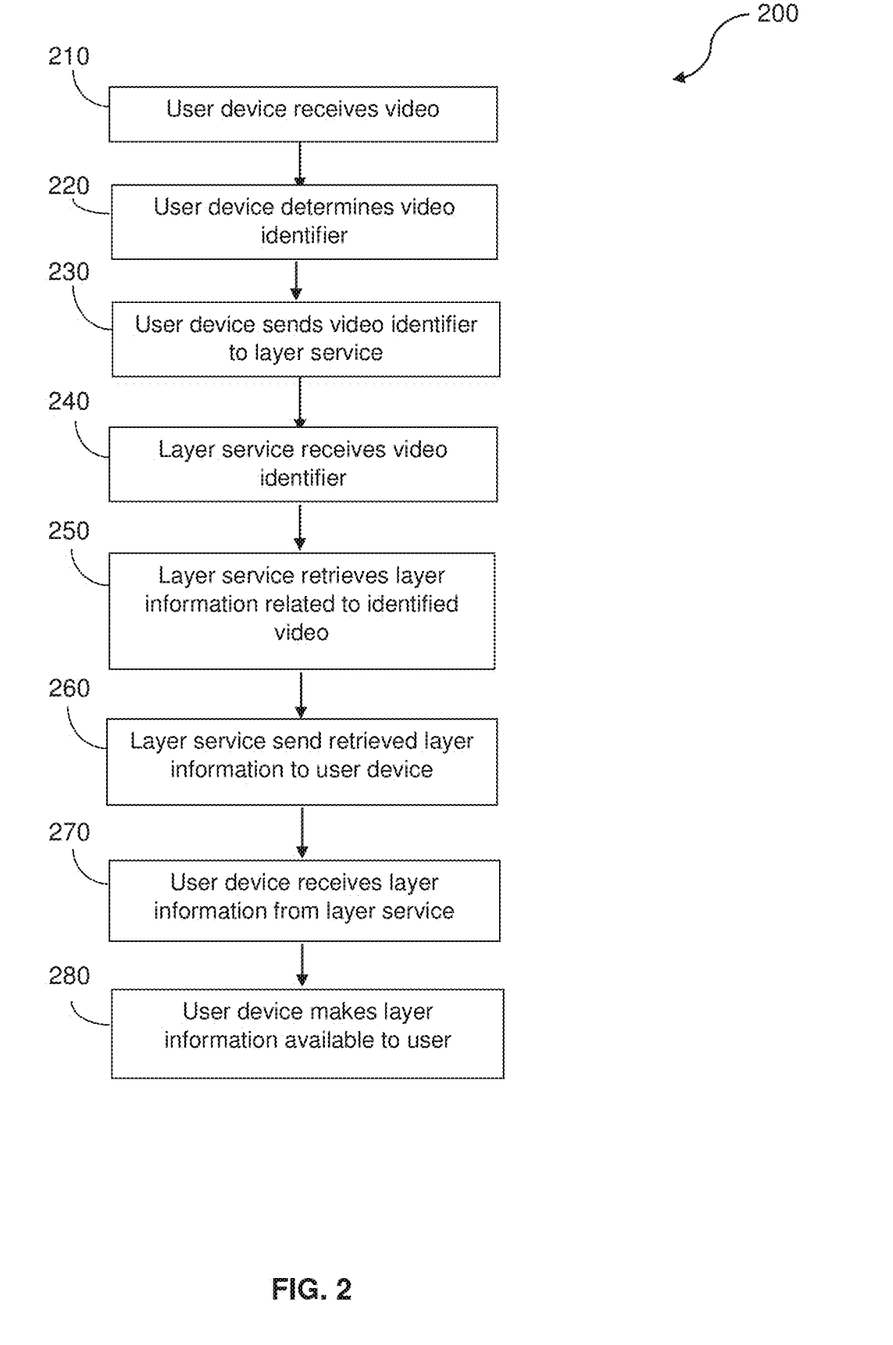
FIG. 2 is a flow chart illustrating the overall operation of systems described herein, according to an embodiment.

In response, at 250 the layer service retrieves the layer information related to the identified video. In embodiments, the layer information may be stored in a database or in some other organized fashion that allows ready access. At 260, the layer service sends the retrieved layer information to the user device. At 270, the user device receives the layer information from the layer service. At 280, the user device makes the layer service available to the user. Examples of interfaces through which the user may access the layer information will be described in greater detail below.

Note that in the above process, the receipt of the video at the user device and the receipt of the layer information are separate processes. In an alternative embodiment, these two operations may not be separate. For example, the video and the related layer information may be received simultaneously. The video and the layer information may be multiplexed together or otherwise combined, for example, and delivered together. This might be desirable if the content were to be portable. In such a case, the layer information may be multiplexed with the video when the latter is initially delivered. The format of a portable container (e.g., MP4 or MKV) could be extended so that layer information could be kept with the video. The layer information would be held in the container such that the entire container file could be moved from device to device for playback without having to access the layer service.

The video and layer information may also be combined when the content is streamed. Here, the video and layer information may be delivered from a content delivery network (CDN). Alternatively, they may be delivered separately, such that the video is sent from a CDN and the layer information is sent from a layer service.

Figure 3:
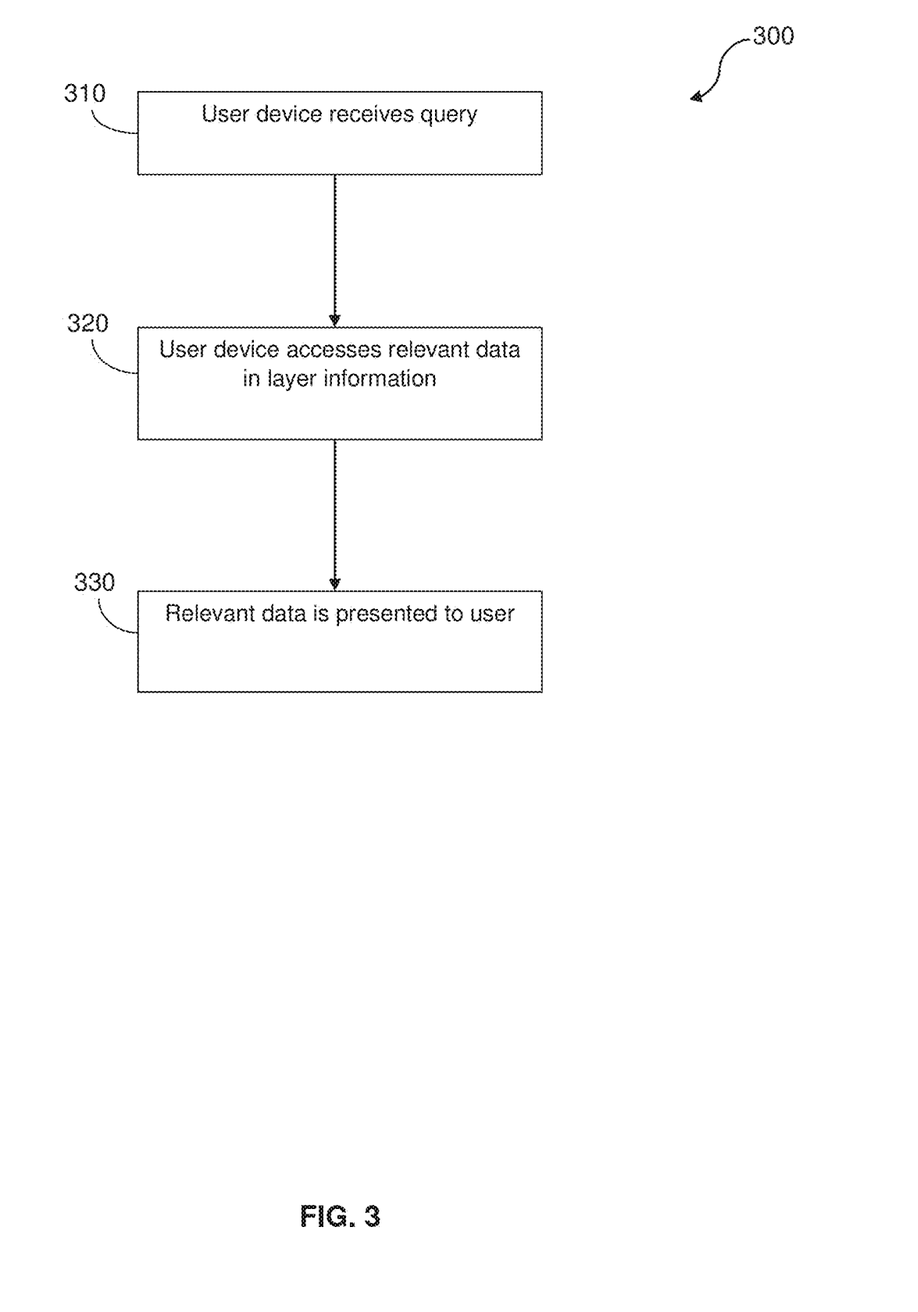
FIG. 3 is a flow chart illustrating operation at a user device, according to an embodiment.

The accessing of layer information at the user device is illustrated in FIG. 3, according to an embodiment. At 310, the user device receives a query from the user during the playing of the video. This query may take the form of an action by the user indicating his desire to access the layer information. For example, the user may click on an object that appears in the video, seeking more information about the object, where this information consists of supplemental content contained in the layer information. In this case, the click represents the query. By clicking on a particular object, the query is understood to be directed to the object or an event surrounding or related to the object, where the object or event is occupies some range of locations in each of several frames of the video. By clicking on a particular point in the video (i.e., a particular time and location in a frame), coordinates of that point are searched in the layer information. Any supplemental content associated with this location may then be read from the layer information. In other embodiments, a click may not be necessary; in such embodiments, the user may move a cursor over the object using a control device, such as a mouse or control pad. Such a "mouse-over" action would then represent the query. At 320, the user device accesses the relevant data in the layer information, i.e., data related to the object or event. At 330, the data is presented to the user. This presentation may take place in a pop-up window or other graphic for example.

If a car is shown, for instance, the user may click on the car to get more information about it. Such information would be part of the layer information, and may concern the make and model, the history of such vehicles, or may be an advertisement for the car for example and without limitation. In a film, an actor may be the object of interest, and clicking on the actor may result in learning more about the actor, such as the names of other films featuring him. In a sporting event, clicking on an object may yield information related to the object or the activity surrounding it. In a pre-recorded hockey game for example, clicking on a net during a scoring play may yield information about the play. The layer information may also include supplemental video; in the hockey example, clicking on the net may allow the user access to other video of the goal, taken from a different angle for example. Alternatively, the layer information may be in text or audio form, or may be a hyperlink through which the user may access additional information.

Figure 4:
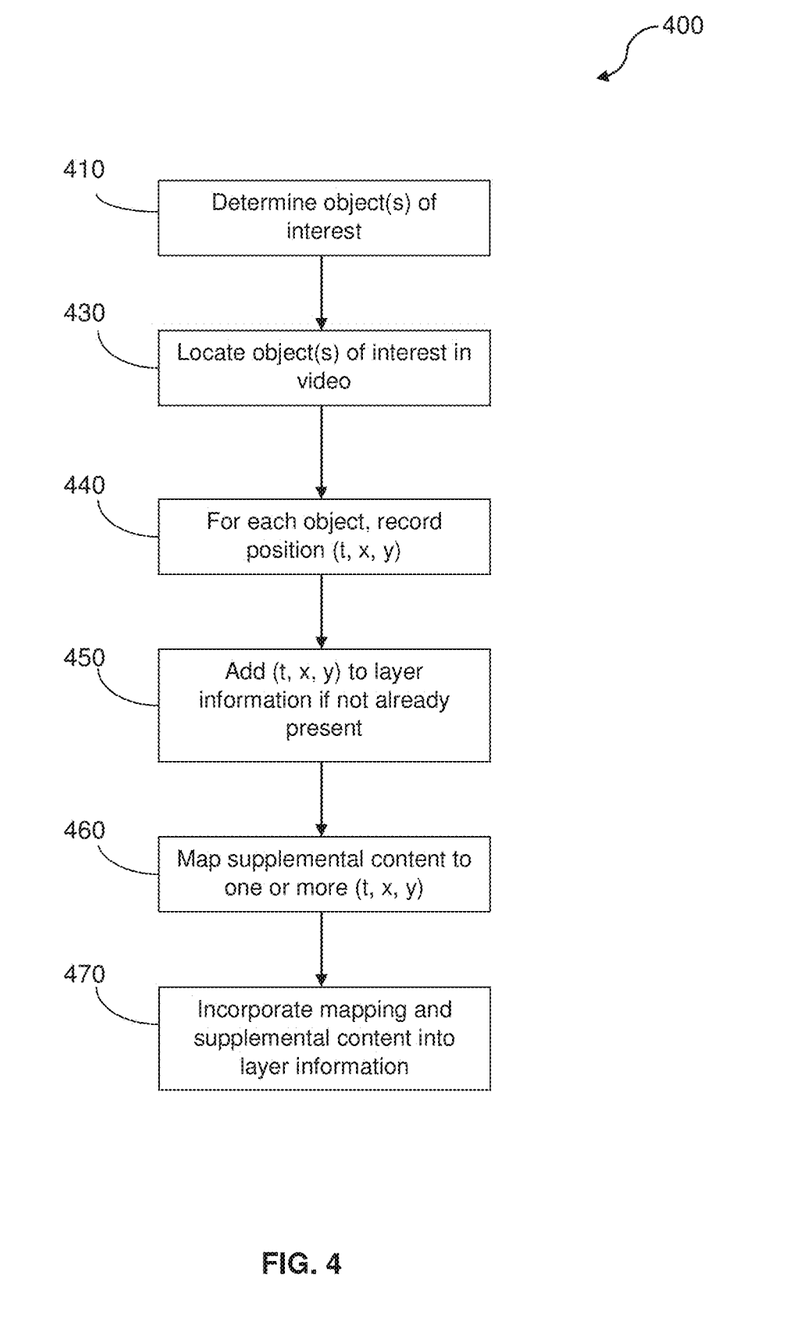
FIG. 4 is a flow chart illustrating construction of layer information, according to an embodiment.

The construction of layering information related to a video is illustrated in FIG. 4, according to an embodiment. This construction may be performed by the content producer in conjunction with production of the content, or may be performed afterwards by the content producer, by commentator(s), or by another interested party. At 410, objects of potential interest in the video are determined. These may be persons or things about which a viewer may be curious, or about which a content producer or other party may wish to provide additional information, such as commentary or advertising. At 430, the determined objects are located in the video. The objects may be located at a particular point, e.g., at a position in time and space using a coordinate system for example; the coordinates identify a time (or time range) in the video in which the object occurs, along with a spatial location (or range thereof) in one or more frames. Such a position may be identified using a time coordinate plus x and y coordinates, or ranges thereof. Therefore, for each object of potential interest, coordinates (t, x, y) or ranges thereof are recorded at 440, representing a position of the object in the video. Note that in alternative embodiments, a third spatial coordinate (z) may also be used.

Note that a particular object may be located in different locations in different frames. To address this, one or more object tracking algorithms known to those of ordinary skill in the art may be used. Once an object's coordinates are determined in a particular frame, its coordinates in subsequent or previous frames may be generated using such an algorithm. This would allow for the determination of an object's position across a sequence frames. These coordinates would also be recorded at 440.

At 450, the coordinates of the object's position is entered into the layer information. At 460, supplemental content related to the object at this position is associated with the position. As noted above, this supplemental content may be text, video, or audio, or may be a hyperlink to such information. In an embodiment, the supplemental content may include commentary from the content producer, or may represent additional information from the producer intended as part of the artistic expression. The supplemental content may also originate from previous viewers of the video, and may include textual comments or the number of likes and/or dislikes registered by these viewers.

At 470, this supplemental content and its association with the coordinates (i.e., the mapping between the object's position and the supplemental content) are added to the layer information. In an embodiment, a descriptor of the object may also be entered and mapped to the position. The descriptor may be a text label, for example, such as "Ferrari" or "Fred Astaire."

The layer information may be organized in any manner known to persons of ordinary skill in the art. For example, items of supplemental content may be indexed by sets of coordinates, where each set of coordinates is associated with an object at these coordinates in the video. This allows for the association of the coordinates of an object with supplemental content, and implements the mapping of supplemental content to coordinates.

Figure 5:
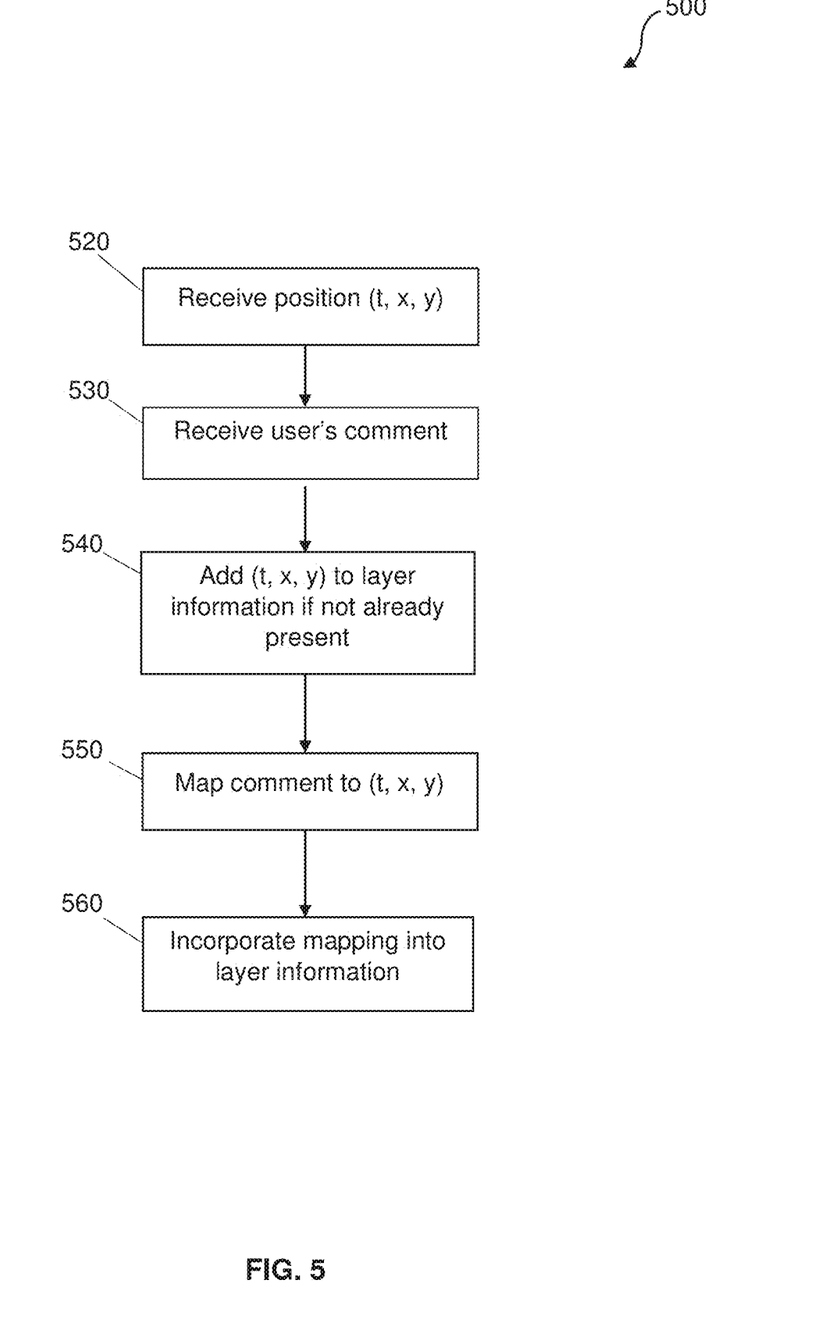
FIG. 5 is a flow chart illustrating the modification of layer information based on user input, according to an embodiment.

In an embodiment, the user may also contribute to or update the layer information. The user may have commentary, other content, or related links to offer other viewers. A process for such input is illustrated in FIG. 5, according to an embodiment. The user may first identify an object in the video, an object about which he would like to provide input. The position (t, x, y) corresponding to the object would be captured at the user device (e.g., through the user's clicking on the object) and conveyed from the user device to the layer service, and is received there at 520. The user would then provide his commentary or other input, which would be received at the layer service at 530. The user's input may take the form of a comment, a "like" or "dislike", or other information that the user believes may be of interest to other viewers. This input may take the form of text, audio, one or more images, video, or a link.

At 540, the position (t, x, y) would be added to the layer information of the video, and at 550 the comment or other user input would be mapped or otherwise associated with the position. At 560, the mapping (i.e., the position, the user input, and the association between the two) would be incorporated into the layer information, thereby adding to or updating the layer information. In an embodiment, the user may also provide a descriptor of the object, such as a word or phrase of text; in such a case, the descriptor would also be added to the layer information.

Figure 6:
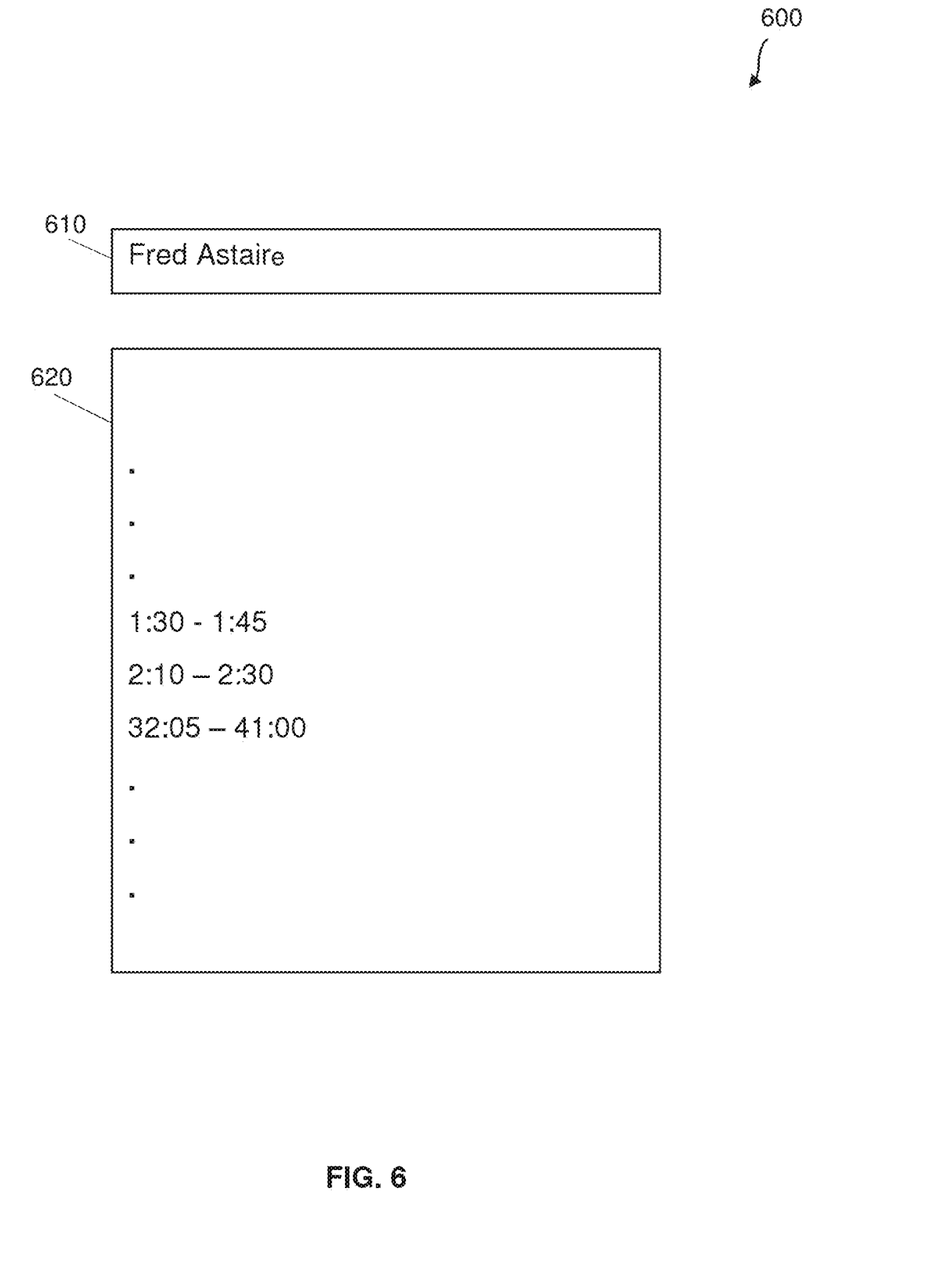
FIG. 6 illustrates a user interface at a user device, where the user interface allows searching in layer information, according to an embodiment.

In an embodiment, the system described herein may provide a number of interfaces for the user. These would allow him to take advantage of the layer information and go directly to point of interest in the video, for example. One possible interface is illustrated in FIG. 6, according to an embodiment. In this example, the video becomes searchable by using the layer information. In a search window 610 the user may enter a descriptor of an object or person of interest. The user device may then scan the layer information for objects matching the descriptor. Here the user is looking for instances of Fred Astaire in the video. Search results may be shown in a results window 620, which indicates ranges of time coordinate t where Fred Astaire appears in the video. In this example, Fred Astaire appears from 1:30 to 1:45 in the video, from 2:10 to 2:30, etc. The user can then fast forward or rewind to those time ranges.

Figure 7:
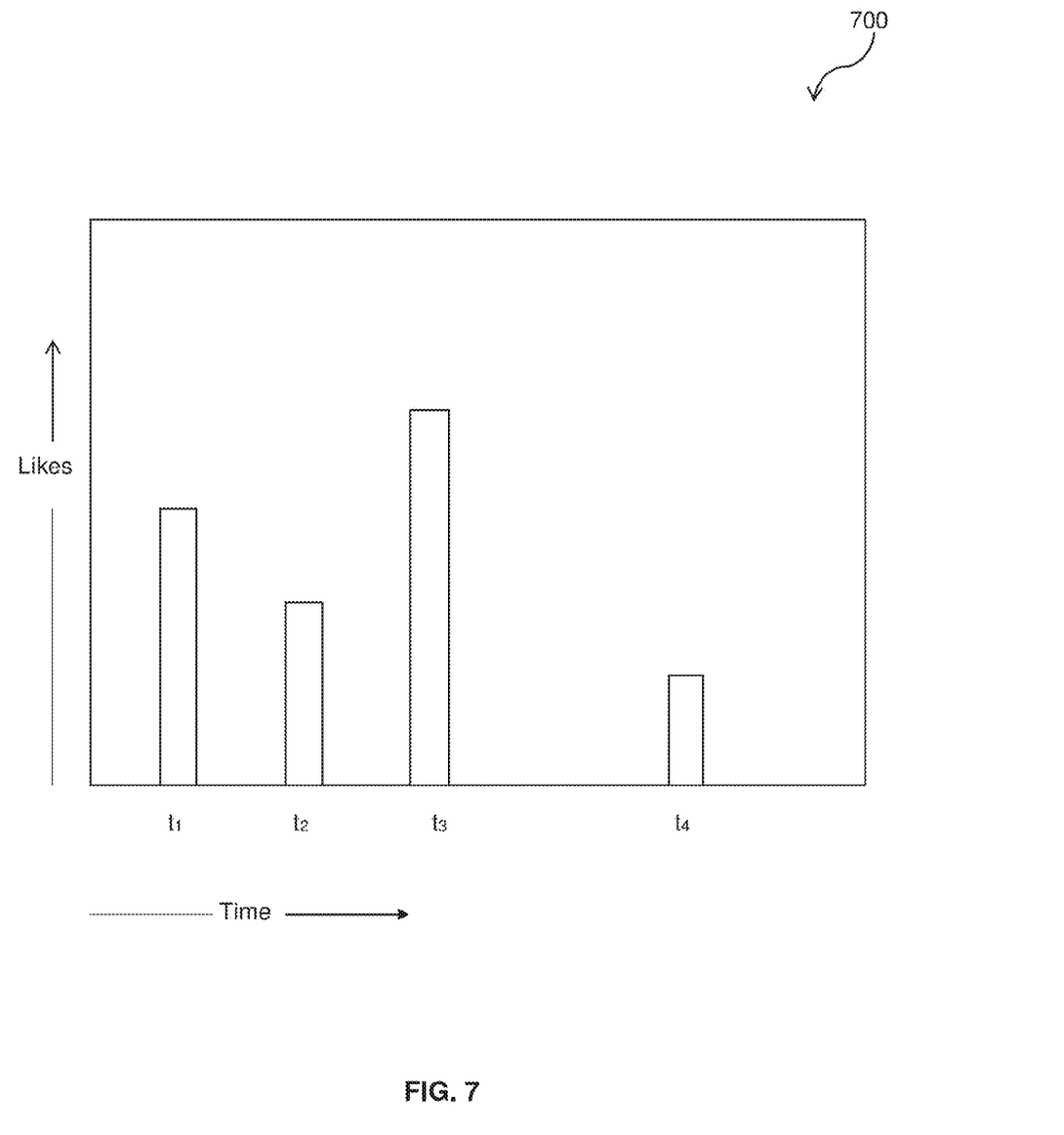
FIG. 7 illustrates an alternative user interface at a user device, where the user interface allows searching in layer information, according to an embodiment.

In various embodiments, other user interface designs may be used to give information to the user regarding the content of the video. In the example of FIG. 7, a graph is presented to the user, showing the number of "likes" that occur in the layer information for various times t in the video. Here, other users will have taken advantage of the feature illustrated in FIG. 5, whereby the users are permitted to add their own commentary to the layer information (likes, in this case). The present user may then see, in advance, what scenes (at time coordinates $t_1$, $t_2$, etc.) received likes, and how many likes these scenes received. The user would then be award of these scenes through user interface 700, and may then fast forward to any of these scenes by going to the appropriate t coordinate. This display represents a table of contents of sorts, showing the user where to find points in the video that were appealing to others.

Figure 8:
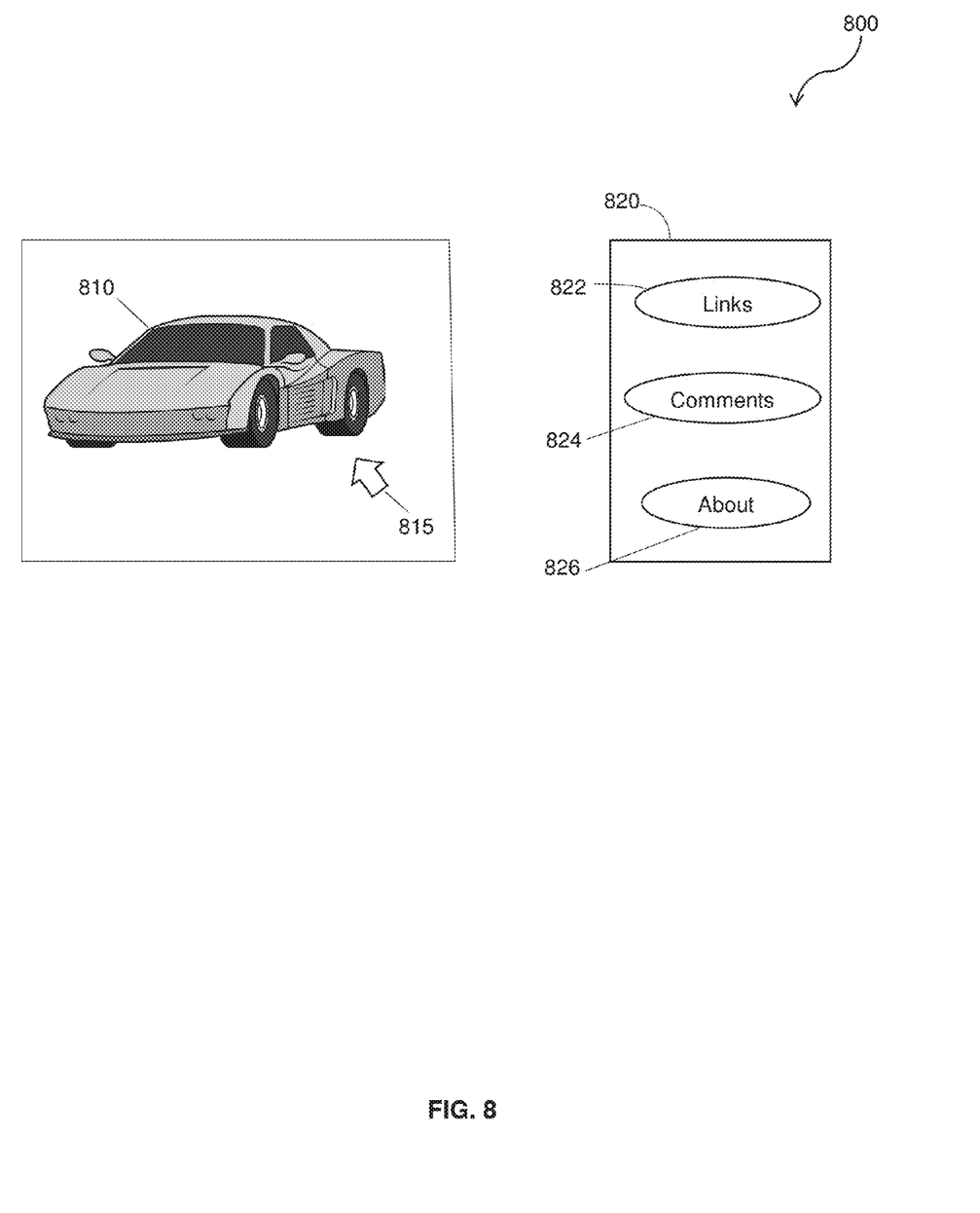
FIG. 8 illustrates another alternative user interface at a user device, where the user interface allows navigation of layer information, according to an embodiment.

The embodiment of FIG. 8 shows an example of an interface that can be made available during a viewing of the video. Here, the left portion of the display shows the video. An object 810 (a car) is visible. The user may then make a query about the object 810, by clicking on it using cursor 815. If available, layer information regarding the object 810 is made available to the user, via menu 820. Information about the object 810 is presented according to categories of information. If the user wishes to see links to information about the object 810, he can click button 822. If the user is interested in comments of other viewers regarding the object 810, he can click button 824. If he is interested in other information about the object 810, he can click button 826. Menu 820 therefore represents a table of contents for the available supplemental content that relates to the object 810.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including at least one computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

In an embodiment, some or all of the processing described herein may be implemented as software or firmware. Such a software or firmware embodiment of layer service functionality is illustrated in the context of a computing system 900 in FIG. 9. System 900 includes one or more central processing unit(s) (CPU), shown as processor(s) 920, and a body of memory 910 that includes one or more non-transitory computer readable media that store computer program logic 940. Memory 910 may be implemented as a read-only memory (ROM) or random access memory (RAM) device, for example. Processor(s) 920 and memory 910 may be in communication using any of several technologies known to one of ordinary skill in the art, such as a bus or a point-to-point interconnect. Computer program logic 940 contained in memory 910 may be read and executed by processor(s) 920. In an embodiment, one or more I/O ports and/or I/O devices, shown collectively as I/O 930, may also be connected to processor(s) 920 and memory 910. In an embodiment, I/O 930 may include the communications interface to one or more user devices.

Figure 9:
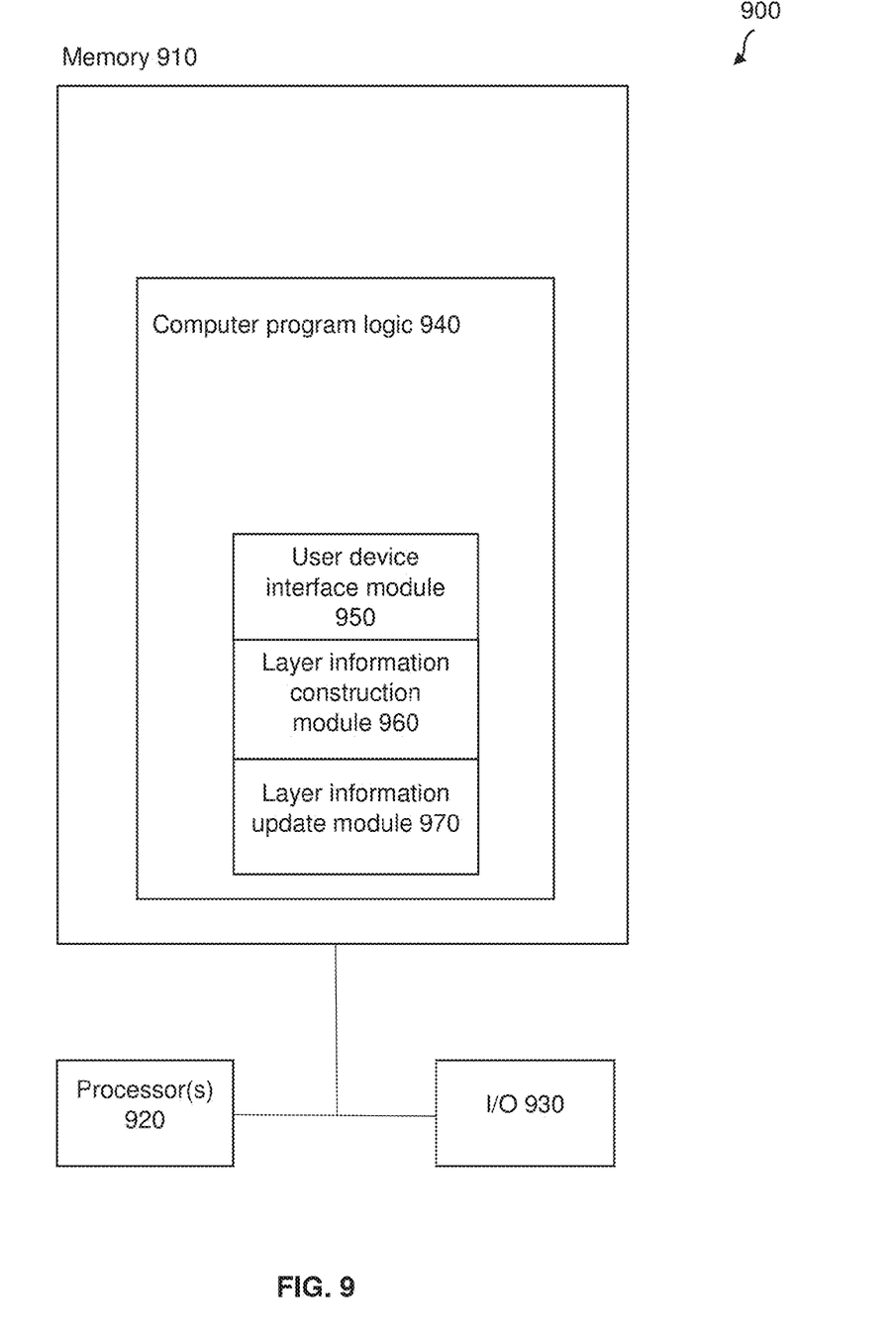
FIG. 9 is a block diagram illustrating a software or firmware embodiment of processing logic at a layer server, according to an embodiment.

In the embodiment of FIG. 9, computer program logic 940 may include a module 950 responsible for facilitating communications with one or user devices. Such communications include the receipt of a video identifier, the sending of layer information, and the receipt of updates thereto, for example. Computer program logic 940 may also include a module 960 responsible for construction of layer information, as illustrated in FIG. 4 according to an embodiment. Computer program logic 940 may also include a module 970 responsible for updating layer information as necessary, if, for example, the user device provides user-supplied content to be added to the layer information.

Figure 10:
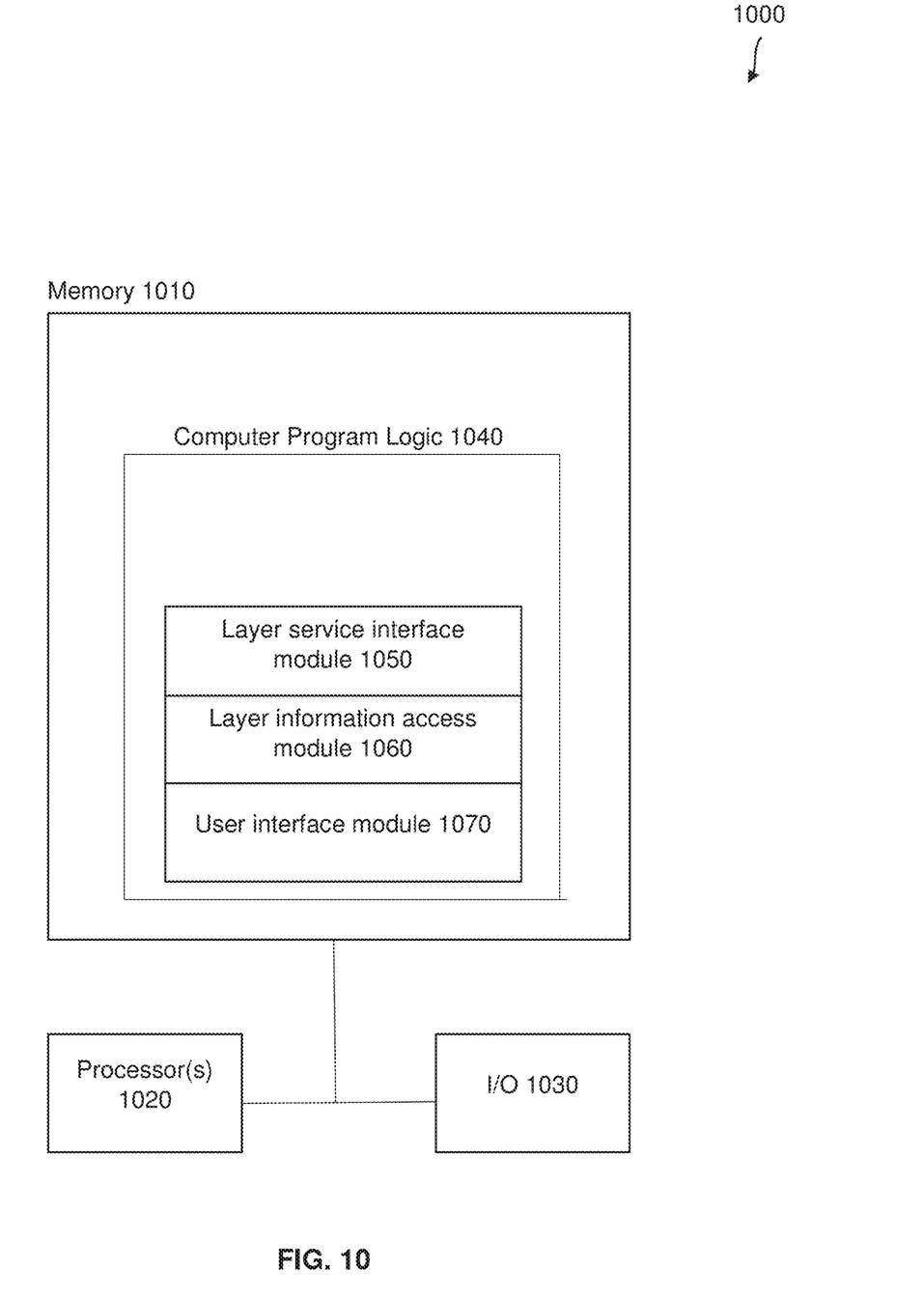
FIG. 10 is a block diagram illustrating a software or firmware embodiment of processing logic at a user device, according to an embodiment.

A software or firmware embodiment of functionality at the user device is illustrated in the context of a computing system 1000 in FIG. 10. System 1000 includes one or more central processing unit(s), shown as processor(s) 1020, and a body of memory 1010 that includes one or more non-transitory computer readable media that store computer program logic 1040. Memory 1010 may be implemented as a read-only memory (ROM) or random access memory (RAM) device, for example. Processor(s) 1020 and memory 1010 may be in communication using any of several technologies known to one of ordinary skill in the art, such as a bus or a point-to-point interconnect. Computer program logic 1040 contained in memory 1010 may be read and executed by processor(s) 1020. In an embodiment, one or more I/O ports and/or I/O devices, shown collectively as I/O 1030, may also be connected to processor(s) 1020 and memory 1010. In an embodiment, I/O 1030 may include the communications interface to the layer service.

In the embodiment of FIG. 10, computer program logic 1040 may include a module 1050 responsible for facilitating communications with the layer service. The computer program logic 1040 may also include a layer information access module 1060 to allow the user device to read the layer information received from the layer service. As described above, the layer information or portions thereof may then be presented to the user. The computer program logic 1040 may also include a user interface module to build and display graphic interfaces (such as those shown in FIGS. 6-8) to display layer information, provide menus for this information, to receive user input, and/or allow the user to contribute to the layer information, for example.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method of supplementing content using a layer server, the method comprising:
receiving a plurality of videos at a layer server, wherein each video is associated with a different set of layers, the layers comprising supplemental content that can be accessed or interacted with at time coordinate points in the videos, wherein a particular set of layers associated with a particular video comprises at least:
a first layer including at least one link to a different video of the plurality of video, and
a second layer including an interface supporting searches for content at certain time coordinates within the particular video;
receiving a video identifier from a user device at the layer server, wherein the video identifier corresponds to the particular video;
retrieving the particular set of layers associated with the particular video identified by the identifier at the layer server;
sending the particular set of layers and the particular video associated with the video identifier to the user device using the layer server, wherein the particular set of layers is displayed over the video at time coordinate points on the user device;
receiving, from the user device and at the layer server:
an identification of a user-designated time coordinate point in the particular video, and
a user-supplied content associated with the user-designated time coordinate point;
mapping the user-supplied content to the user-designated time coordinate point in the particular video at the layer server;
incorporating the user-supplied content at the user-designated time coordinate point into a third layer of the particular set of layers using the layer server; and
transmitting the third layer that incorporates the user-supplied content to a different user device that is viewing the particular video using the layer server.

2. The method of claim 1, further comprising:
building a table of contents in an additional layer, wherein the table of contents identifies the particular points in the video and the supplemental content that is accessible at the particular points; and
sending the table of contents in the additional layer to the user device.

3. The method of claim 1, further comprising:
construction of the layers prior to retrieving the particular set of layers.

4. The method of claim 3, wherein said construction of the layers comprises:
identifying objects of interest in a video;
for each object of interest, identifying and recording one or more points in the video when the object occurs;
mapping at least a portion of the supplemental content to the one or more points; and
incorporating the portion of the supplemental content, or a link thereto, and the mapping into a layer.

5. The method of claim 4, wherein each of the particular points in the video comprises one or more of:
a time coordinate of the particular point or a range thereof;
an x coordinate of the particular point or a range thereof; and
a y coordinate the particular point or a range thereof;
wherein the x and y coordinates or ranges thereof represent a location or range thereof in one or more frames that correspond to the time coordinate or range thereof.

6. The method of claim 1, wherein the particular set of layers are sent to the user device separately from the particular video.

7. The method of claim 1, wherein the particular set of layers is multiplexed with the particular video before sending the particular set of layers and the particular video to the user device.

8. The method of claim 1, wherein the supplemental content comprises one or more of:
supplemental video related to the object of interest in the video;
supplemental audio related to the object of interest in the video;
supplemental text related to the object of interest in the video; and
a hyperlink related to the object of interest in the video.

9. The method of claim 8, wherein the supplemental video provides an alternative perspective of the object.

10. The method of claim 1, wherein the supplemental content comprises advertising.

11. The method of claim 1, wherein the user designated point in the particular video comprises one or more of:
a time coordinate or range thereof;
an x coordinate or range thereof; and
a y coordinate or range thereof;

wherein the x and y coordinates, or ranges thereof, represent a location or range thereof in one or more frames corresponding to the time coordinate or range thereof.

12. The method of claim 1, wherein the user-supplied content comprises one or more of:
supplemental video related to an object in the video corresponding to the user-designated point;
supplemental audio related to the object in the video corresponding to the user-designated point;
supplemental text related to the object in the video corresponding to the user-designated point; and
a hyperlink related to the object in the video corresponding to the user-designated point.

13. A computer program product for supplementing content, including a non-transitory computer readable medium having an application stored therein, wherein upon execution by a processor of an electronic device the application directs the processor to perform the following operations:
receiving a plurality of videos, wherein each video is associated with a different set of layers, the layers comprising supplemental content that can be accessed or interacted with at time coordinate points in the videos, wherein a particular set of layers associated with a particular video comprises at least:
a first layer including at least one link to a different video of the plurality of video, and
a second layer including an interface supporting searches for content at certain time coordinates within the particular video;
receiving a video identifier from a user device, wherein the video identifier corresponds to the particular video;
retrieving the particular set of layers associated with the particular video identified by the identifier;
sending the particular set of layers and the particular video associated with the video identifier to the user device, wherein the particular set of layers is displayed over the video at time coordinate points on the user device;
receiving, from the user device:
an identification of a user-designated time coordinate point in the particular video, and
a user-supplied content associated with the user-designated time coordinate point;
mapping the user-supplied content to the user-designated time coordinate point in the particular video;
incorporating the user-supplied content at the user-designated time coordinate point into a third layer of the particular set of layers; and
transmitting the third layer that incorporates the user-supplied content to a different user device that is viewing the particular video.

14. The computer program product of claim 13, the computer program logic further comprising:
building a table of contents in an additional layer, wherein the table of contents identifies the particular points in the video and the supplemental content that is accessible at the particular points; and
sending the table of contents in the additional layer to the user device.

15. The computer program product of claim 13, the computer program logic further comprising:
construction of the layers prior to retrieving the particular set of layers.

16. The computer program product of claim 15, wherein said construction of the layers comprises:
identifying objects of interest in a video;
identifying and recording, for each object of interest, one or more points in the video when the object occurs;
mapping at least a portion of the supplemental content to the one or more points; and
incorporating the portion of the supplemental content, or a link thereto, and the mapping into a layer.

17. The computer program product of claim 16, wherein each of the particular points in the video comprises one or more of:
a time coordinate of the particular point or a range thereof;
an x coordinate of the particular point or a range thereof; and
a y coordinate the particular point or a range thereof;
wherein the x and y coordinates or ranges thereof represent a location or range thereof in one or more frames that correspond to the time coordinate or range thereof.

18. The computer program product of claim 13, wherein the particular set of layers are is sent to the user device separately from the particular video.

19. The computer program product of claim 13, wherein the particular set of layers is multiplexed with the particular video before sending the particular set of layers and the particular video to the user device.

20. The computer program product of claim 13, wherein the supplemental content comprises one or more of:
supplemental video related to the object of interest in the video;
supplemental audio related to the object of interest in the video;
supplemental text related to the object of interest in the video; and
a hyperlink related to the object of interest in the video.

21. The computer program product of claim 20, wherein the supplemental video provides an alternative perspective of the object.

22. The computer program product of claim 13, wherein the supplemental content comprises advertising.

23. The computer program product of claim 13, wherein the user designated point in the particular video comprises one or more of:
a time coordinate or range thereof;
an x coordinate or range thereof; and
a y coordinate or range thereof;
wherein the x and y coordinates, or ranges thereof, represent a location or range thereof in one or more frames corresponding to the time coordinate or range thereof.

24. The computer program product of claim 13, wherein the user-supplied content comprises one or more of:
supplemental video related to an object in the video corresponding to the user-designated point;
supplemental audio related to the object in the video corresponding to the user-designated point;
supplemental text related to the object in the video corresponding to the user-designated point; and
a hyperlink related to the object in the video corresponding to the user-designated point.

25. A system for supplementing content, comprising:
a processor; and
a memory in communication with said processor, said memory for storing a plurality of processing instructions for directing said processor to:
receive a plurality of videos, wherein each video is associated with a different set of layers, the layers comprising supplemental content that can be accessed or interacted with at time coordinate points in the videos, wherein a particular set of layers associated with a particular video comprises at least:
a first layer including at least one link to a different video of the plurality of video and a second layer including an interface supporting searches for content at certain time coordinates within the particular video;

receive a video identifier from a user device, wherein the video identifier corresponds to the particular video;

retrieving the particular set of layers associated with the particular video identified by the identifier;

send the particular set of layers and the particular video associated with the video identifier to the user device, wherein the particular set of layers is displayed over the video at time coordinate points the user device;

receive, from the user device:
　an identification of a user-designated time coordinate point in the particular video, and
　a user-supplied content associated with the user-designated time coordinate point;

map the user-supplied content to the user-designated time coordinate point in the particular video;

incorporate the user-supplied content at the user-designated time coordinate point into a third layer of the particular set of layers; and transmit the third layer that incorporates the user-supplied content to a different user device that is viewing the particular video.

26. The system of claim 25, wherein said plurality of processing instructions further direct said processor to:
　build a table of contents in an additional layer, wherein the table of contents identifies the particular points in the video and the supplemental content that is accessible at the particular points; and
　send the table of contents in the additional layer to the user device.

27. The system of claim 25, wherein said plurality of processing instructions further direct said processor to:
　construct the layers prior to retrieving the particular set of layers.

28. The system of claim 27, wherein the construction of the layers comprises:
　identifying objects of interest in a video;
　for each object of interest, identifying and recording one or more points in the video when the object occurs;
　mapping at least a portion of the supplemental content to the one or more points; and
　incorporating the portion of the supplemental content, or a link thereto, and the mapping into a layer.

29. The system of claim 28, wherein each of the particular points in the video comprises one or more of:
　a time coordinate of the particular point or a range thereof;
　an x coordinate of the particular point or a range thereof; and
　a y coordinate the particular point or a range thereof;
　wherein the x and y coordinates or ranges thereof represent a location or range thereof in one or more frames that correspond to the time coordinate or range thereof.

30. The system of claim 25, wherein the particular set of layers are is sent to the user device separately from the video.

31. The system of claim 25, wherein the particular set of layers is multiplexed with the particular video before sending the particular set of layers and the particular video to the user device.

32. The system of claim 25, wherein the supplemental content comprises one or more of:
　supplemental video related to the object of interest in the video;
　supplemental audio related to the object of interest in the video;
　supplemental text related to the object of interest in the video; and
　a hyperlink related to the object of interest in the video.

33. The system of claim 32, wherein the supplemental video provides an alternative perspective of the object.

34. The system of claim 25, wherein the supplemental content comprises advertising.

35. The system of claim 25, wherein the user designated point in the particular video comprises one or more of:
　a time coordinate or range thereof;
　an x coordinate or range thereof; and
　a y coordinate or range thereof;
　wherein the x and y coordinates, or ranges thereof, represent a location or range thereof in one or more frames corresponding to the time coordinate or range thereof.

36. The system of claim 25, wherein the user-supplied content comprises one or more of:
　supplemental video related to an object in the video corresponding to the user-designated point;
　supplemental audio related to the object in the video corresponding to the user-designated point;
　supplemental text related to the object in the video corresponding to the user-designated point; and
　a hyperlink related to the object in the video corresponding to the user-designated point.

* * * * *